US006406185B1

(12) United States Patent
Lin

(10) Patent No.: US 6,406,185 B1
(45) Date of Patent: Jun. 18, 2002

(54) SPINDLE SEAT IN A FAN

(75) Inventor: Yu-Liang Lin, Kaohsiung (TW)

(73) Assignee: Asia Vital Components Co., Ltd., Kaohsiung (TW)

( * ) Notice: Subject to any disclaimer, the term of this patent is extended or adjusted under 35 U.S.C. 154(b) by 70 days.

(21) Appl. No.: 09/697,293

(22) Filed: Oct. 27, 2000

(51) Int. Cl.[7] .............................................. F16C 17/08
(52) U.S. Cl. ....................................... 384/246; 384/903
(58) Field of Search ................................ 384/246, 903, 384/245, 244, 420

(56) References Cited

U.S. PATENT DOCUMENTS 2,894,439 A * 7/1959 Burger et al. ............... 384/246
3,300,260 A * 1/1967 Stern .......................... 384/246
4,452,540 A * 6/1984 Rivoir ........................ 384/225

* cited by examiner

*Primary Examiner*—Lenard A. Footland
(74) *Attorney, Agent, or Firm*—Bacon & Thomas, PLLC

(57) ABSTRACT

A spindle seat in a fan provides a spindle holding seat and a spindle with a conical end. Because the conical end contacts with the holding seat by way of point contact, the frictional area between the holding seat and the conical end is very small. Hence, a little friction force may generate to result in the fan is provided with a smooth running, low noise, and less heat generation.

2 Claims, 3 Drawing Sheets

SPINDLE SEAT IN A FAN

BACKGROUND OF THE INVENTION

1. Field of the Invention

The present invention relates to a spindle seat in a fan, and particularly to a spindle seat, which contacts with a spindle provided with conical end to result in a reduced frictional resistance for a fan with smooth run and low noise under a condition of less heat generation.

2. Description of Related Art

The application of cooling fan has been widely in a variety of locations such as the central processing unit and the power supply device in a computer. Once the cooling fan abnormally provides the function of cooling, it may affect the equipment to run smoothly. It is therefore that the cooling fan plays an important role for a normal operation of the equipment.

The conventional cooling fan usually provides a structure shown in FIG. 3 that a spindle 2 is pivotally fixed to the center of a stator in a motor by way of ball bearings 322. Although the ball bearing 322 is a point contact with the spindle 2 for an easy running of the spindle 2, metal balls in the ball bearing 322 may generate noise and the ball bearing 322 is expensive in cost. In order to lower the cost, an oil bearing is used to replace the ball bearing 233. But, the inner wall of the oil bearing may wear out after being used for a period of time. Thus, it results in the axial fitting hole thereof has a size of inaccuracy such that the noise and the friction force may increase gradually.

SUMMARY OF THE INVENTION

Accordingly, a main object of the present invention is to provide a spindle seat in a fan, which comprises a spindle with a conical end to reduce a frictional area so as to minimize the friction force generated.

BRIEF DESCRIPTION OF THE DRAWINGS

The structure, characteristics, and other objects and features of the present invention can be more fully understood by referring to the following description of preferred embodiments and accompanying drawing, in which.

DETAILED DESCRIPTION OF THE PREFERRED EMBODIMENTS

Figure 1:
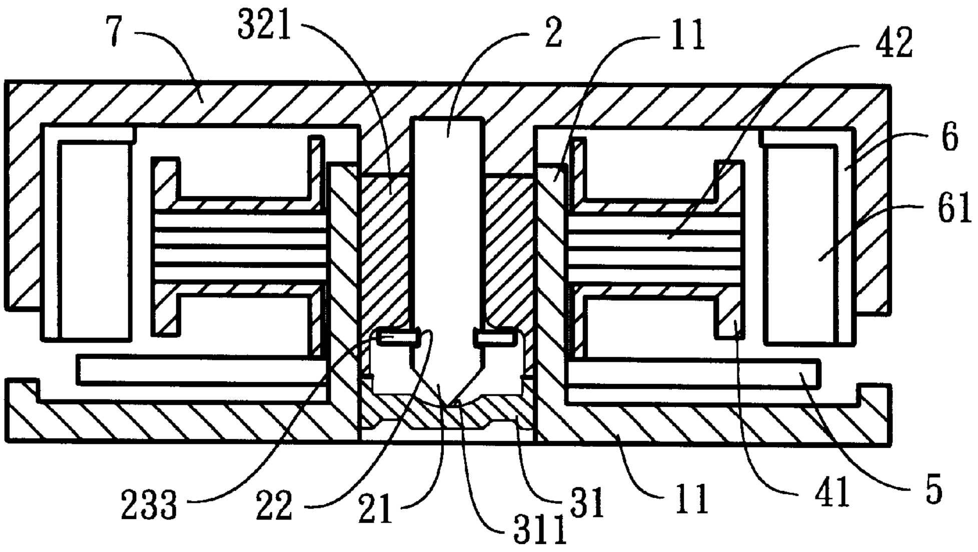
FIG. 1 is a sectional view of a spindle seat in a fan according to the present invention.

Referring to FIG. 1, a spindle seat according to the present invention is composed of a base 11, a spindle 2, a holding seat 31, a retaining ring 233, and an oil bearing 321. In addition to the spindle seat, a insulator frame 41, silicon steel sheets 42, a circuit board 5, a magnetic block 61, a motor casing 6, and fan blades 7 are provided to constitute a cooling fan.

The spindle 2 at an end thereof has a conical point 21 and an annular groove 22 is disposed on the spindle 2 near the conical point 21.

The holding seat 31 is located at the base 11 and at the central area thereof is provided with a circular recession 311.

The oil bearing 321 is made of oily plastics or ceramics to be provided in the base.

It is noted that the spindle 2 is received in the oil bearing 321 and the retaining ring 233 fits with the annular groove 22 to limit the spindle 2 displacing axially. The conical point 21 then presses against the holding seat 31.

Because the conical point 21 keeps contact with the circular recession 311 on the holding seat 31 and the friction force at this part is extremely small, the fan blades 7 can be rotated easily under a condition of less heat. Furthermore, the holding seat 31 can locate the entire spindle 2 and support most weight of the spindle 2 so that the oil bearing 321 only supports a small part of the weight thereof. Hence, the oil bearing 321 is not possible to wear out easily so as to generate noise such that an extended durability can be obtained.

Figure 2:
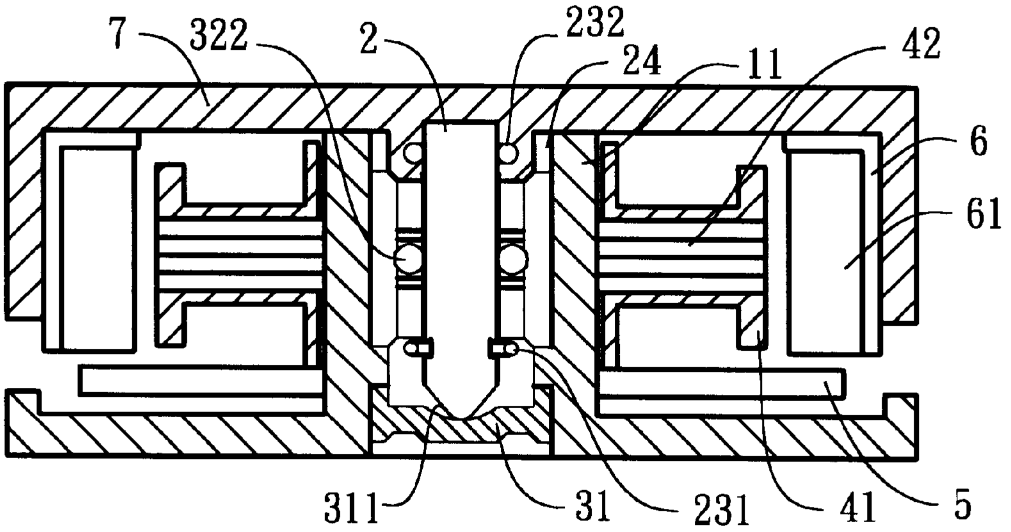
FIG. 2 is a sectional view of another embodiment of the present invention.
Figure 3:
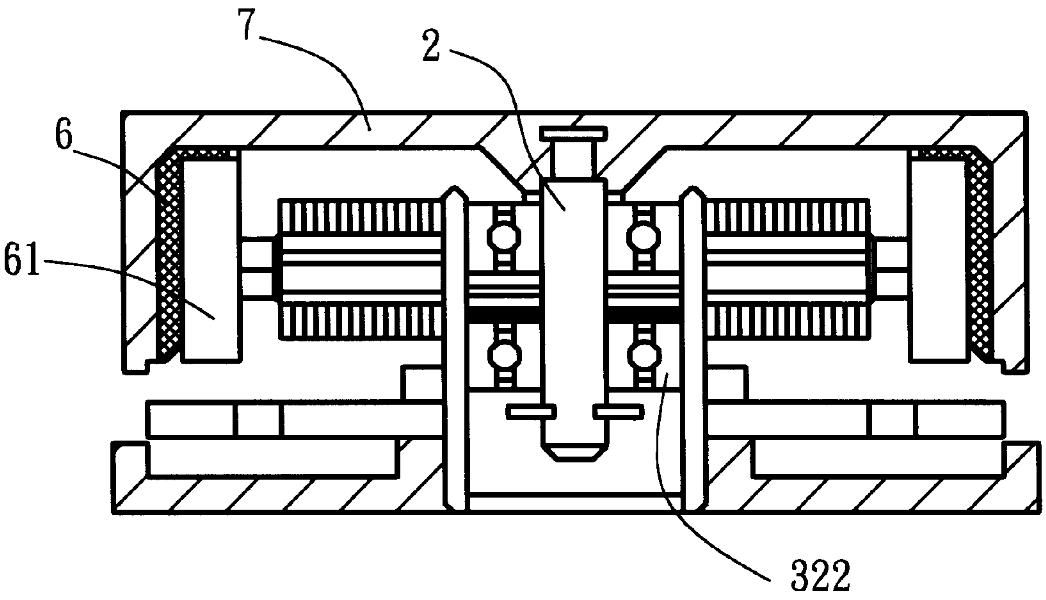
FIG. 3 is a sectional view of a prior art of spindle seat.

Alternatively, a ball bearing 322 can be used instead of the oil bearing 321 and a copper stop ring 24 is provided to limit the ball bearing 322 displacing axially as shown in FIG. 2. It can be seen in FIG. 2 that the holding seat 31 is also provided to support most part of load coming from the spindle 2 and to locate the spindle 2. Hence, the ball bearing 322 may also obtain an extended durability.

It is appreciated that the present invention substantially overcomes the defect of the prior art to make the fan blades on a cooling fan easily running with less heat.

While the invention has been described with reference to preferred embodiments thereof, it is to be understood that modifications or variations may be easily made without departing from the spirit of this invention, which is defined by the appended claims.

What is claimed is:

1. A spindle seat, comprising a base, a spindle, a holding seat, a retaining ring, and a bearing; characterized in that the spindle at an end thereof is a conical point, and provides an annular groove near the conical point;

the holding seat is located at the base and at a central area thereof is provided with a circular recession; and the spindle is received in the bearing, a copper stop ring fits with the annular groove to limit the spindle displacing axially, and the conical point keeps contact with circular recession.

2. The spindle seat according to claim 1, wherein the bearing can be an oil bearing made of oily plastics or ceramics, or a ball bearing.

* * * * *